United States Patent [19]

Cartry et al.

[11] Patent Number: 4,784,561

[45] Date of Patent: Nov. 15, 1988

[54] DEVICE FOR THE REMOTE FEEDING OF CYLINDRICAL PIECES TO AN AUTOMATIC MACHINE, SUCH AS A MACHINE PLUGGING THE TUBES OF A STEAM GENERATOR OF A PRESSURIZED-WATER NUCLEAR REACTOR

[75] Inventors: Jean P. Cartry; Denis Schlaudecker, both of Lyons, France

[73] Assignee: Framatome, Courbevoie, France

[21] Appl. No.: 44,177

[22] Filed: Apr. 30, 1987

[30] Foreign Application Priority Data

Apr. 30, 1986 [FR] France ............... 86 06341

[51] Int. Cl.⁴ .......................................... B65H 5/22
[52] U.S. Cl. ...................... 414/222; 29/723; 29/809; 165/11.2; 376/206; 406/165; 901/46
[58] Field of Search .............. 29/723, 809, 709, 712, 29/714; 165/11.2, 76; 198/468.2, 468.4, 468.5; 221/278; 376/260; 406/154, 164, 165, 176, 179; 414/222, 224, 225; 138/121, 122; 294/119.2, 119.3, 907, 99.1; 901/41, 46, 49

[56] References Cited

U.S. PATENT DOCUMENTS

| | | | |
|---|---|---|---|
| 365,630 | 6/1887 | Pratt et al. ........................ | 138/122 |
| 3,540,622 | 11/1970 | Spisak ............................ | 221/278 X |
| 4,002,265 | 1/1977 | Dixon ............................. | 221/210 |
| 4,035,900 | 7/1977 | Boyko et al. ..................... | 29/795 |
| 4,044,462 | 8/1977 | Anselmo .......................... | 29/809 |
| 4,593,948 | 6/1986 | Borcea et al. .................... | 294/907 X |
| 4,660,270 | 4/1987 | Rieben et al. .................... | 29/723 X |

FOREIGN PATENT DOCUMENTS

| | | | |
|---|---|---|---|
| 119183 | 7/1984 | Japan . | |
| 123232 | 7/1985 | Japan ............................. | 29/709 |

Primary Examiner—P. W. Echols
Assistant Examiner—Andrew E. Rawling
Attorney, Agent, or Firm—Pollock, Vande Sande & Priddy

[57] ABSTRACT

The feed device comprises a housing (10) of sufficient size to contain a cylindrical piece (15), equipped with a removable cover (20), through which passes a nozzle (24) connected to a compressed-air distribution source (25, 26). A flexible pipe (11) is fastened at one of its ends to the housing (10). A loading unit (12) consisting of a fixed part (28) and of a rotary arm (29) is connected to the end of the flexible pipe (11) opposite the housing (10). The pieces (15) can, in particular, be plugs for plugging the tubes of a steam generator of a pressurized-water nuclear reactor.

7 Claims, 3 Drawing Sheets

DEVICE FOR THE REMOTE FEEDING OF CYLINDRICAL PIECES TO AN AUTOMATIC MACHINE, SUCH AS A MACHINE PLUGGING THE TUBES OF A STEAM GENERATOR OF A PRESSURIZED-WATER NUCLEAR REACTOR

FIELD OF THE INVENTION

The invention relates to a device for the remote feeding of cylindrical pieces to an automatic machine for placing these pieces in a fixed installation, such as a machine for plugging the tubes of a steam generator of a pressurized water nuclear reactor.

BACKGROUND OF THE INVENTION

The steam generators of pressurized-water nuclear reactors usually comprise a bundle consisting of a very large number of tubes of small diameter, inside which circulates, at a high temperature, the pressurized water coming from the reactor vessel.

The feed water of the steam generator comes into contact with the outer surface of these tubes, as a result of which the feed water is heated and evaporated by the heat of the pressurized water constituting the heat-exchange fluid of the reactor. The tubes of the bundle are bent in the form of a U and, at each of their ends, are fastened in a tube plate fixed to the casing of the steam generator. The pressurized water is distributed and recovered in the tubes by a generally hemispherical two-part water box located under the tube plate.

The many stresses to which the tubes of the steam generator are subjected, for example the phenomena of stress corrosion, can cause damage to the tubes. When a tube is damaged, it has to be put out of action quickly, in order to prevent the primary heat-exchange fluid containing radioactive elements from escaping from this tube and mixing with the feed water constituting the secondary fluid some of which is discharged into the atmosphere in the form of steam. Defective tubes are put out of action by plugging their two ends in the region of the tube plate.

To carry out this plugging operation, it has been proposed to use a manual appliance ensuring that the plug is introduced into the tube and expanded inside the tube. A plug consisting of a cylindrical piece of a diameter slightly less than the inside diameter of the tube and having an inner bore is screwed to the end of the appliance which is subsequently introduced into the tube to be plugged. The control of the appliance makes it possible by means of a jack to exert a pull on a rod, ensuring the diametrical expansion of the plug inside the tube.

The disadvantage of such a process is that an operator needs to be present inside the water box to operate the manual appliance. This operator is therefore exposed to a radioactive environment, and consequently the time spent on his work must be reduced to a minimum. The material and psychological conditions of this work are also unfavorable, and because of this the operator, when he works for the maximum time allowed, can only do a very incomplete job.

In the maintenance and repair of a steam generator which has several defective tubes, it is necessary to provide a relatively large team of qualified trained operators.

To overcome these disadvantages and make the job of maintenance operators easier, automatic machines making it possible to plug the tubes by remote control have been developed, the operation being controlled and monitored from a a work station located outside the water box. Such machines, comprising a device for supporting, moving and positioning the plugging appliance, generally have a magazine in which the plugs are stored and which has a form similar to that of a loader for automatic weapons. However, such a magazine has a limited capacity, as a result of which the period of operation of the machine inside the water box is restricted.

SUMMARY OF THE INVENTION

The object of the invention is, therefore, to provide a device for the remote feeding of cylindrical pieces to an automatic machine for placing these pieces in a fixed installation, such as a machine for plugging the tubes of the steam generator of a pressurized-water nuclear reactor, this machine comprising a support connected to the installation and a tool movable on the support in a specific direction, for taking up the cylindrical pieces and positioning them in the installation, the feed device being very simple and extremely reliable and making it possible to extend, as required, the period of operation of the automatic machine in the installation.

To this end, the feed device according to the invention comprises (1) a feed housing of sufficient size to contain a cylindrical piece, having two opposite faces each provided with an being, one of these orifices, or first orifice, of a size sufficient to allow the passage of a cylindrical piece, being equipped with a removable cover, through which passes a nozzle connected to a compressed-air distribution means, and the second orifice being aligned with the first, (2) a flexible pipe, the inside diameter of which is greater than the diameter of the cylindrical pieces and which is fastened at one of its ends to the housing in the region of the second orifice and, (3) a loading unit fastened to the support and consisting of (a) a fixed part connected rigidly to the support and having a bore which extends in a direction parallel to the direction of movement to the tool and in which is fastened the second end of the flexible pipe, and a rotary arm which has a receptacle receiving the cylindrical pieces and which is mounted on the fixed part so as to be articulated about an axis parallel to the direction of movement of the tool and is movable by a means of movement, between a position for receiving the cylindrical pieces, in which the receptacle of the rotary arm is in the extension of the bore of the fixed part, and at least one loading position, in which a cylindrical piece located inside the rceptacle of the rotary arm can be taken up by the tool.

In order that the invention may be more clearly understood, an embodiment of a feed device according to the invention, associated with a machine for plugging the tubes of a steam generator of a pressurized-water nuclear reactor, will now be described by way of example, with reference to the accompanying drawings, in which FIG. 1 is a perspective view of the plugging tool and of the feed device;

DESCRIPTION OF PREFERRED EMBODIMENT

Figure 1:
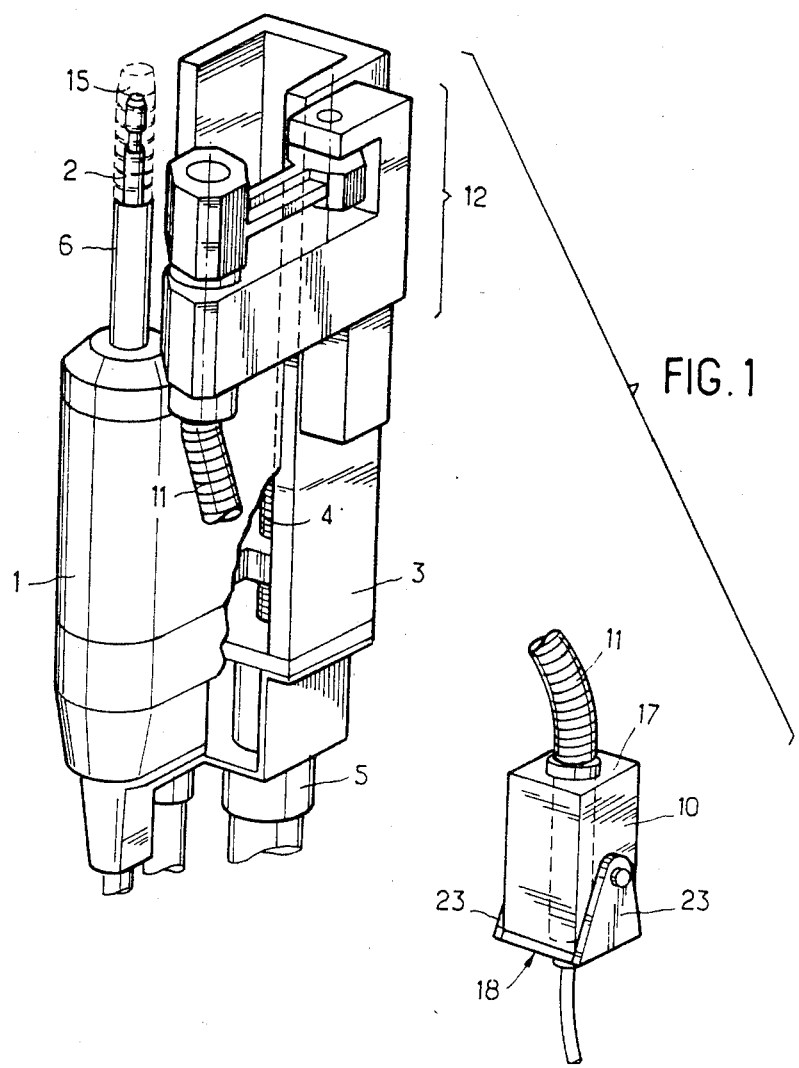

FIG. 1 shows the plugging tool 1 consisting of a jack, the rod 6 of which is extended by a mandrel 2 which at its end carries the device for expanding the plug. The tool 1 is mounted, so as to be movable in the vertical direction, on a vertical-movement device 3 comprising an endless screw 4 driven by a motor 5.

Figure 2:
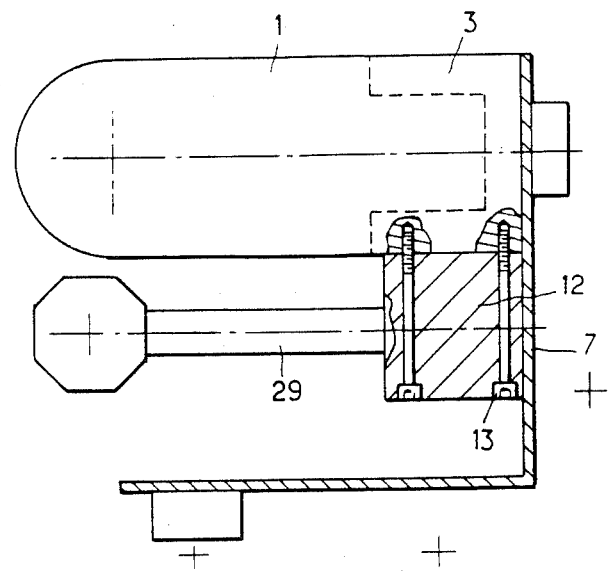
FIG. 2 is a diagrammatic plan view of the plugging machine and of the feed device.

As can be seen in FIG. 2, the device 3 making it possible to raise and lower the tool 1 is fastened to a support 7 which allows the tool to be placed in the operating position vertically in line with each of the tubes of the steam generator, inside the water box.

The tool for plugging the tubes and the support movable inside the water box are well known in the prior art.

The movable supporting device can, for example, be of the type designed and developed by FRAMATOME and designated by technicians as a "spider".

The automatic plugging machine comprising the tool 1, its means of movement 3, 7 and all the means for the remote control, monitoring and display of the plugging operations is likewise well known in the prior art.

The remote-feed device associated with this automatic machine comprises a feed housing 10, a flexible pipe 11 and a loading unit 12, as can be seen in FIGS. 1 and 2.

During the phases of use of the device on a steam generator, the housing 10 is located outside the water box of the steam generator in a non-irradiated zone and is therefore accessible to the operator supervising the plugging operation.

The tool 1 and its vertical-movement device 3 are carried by the movable support 7 inside the water box. The loading unit 12 of the feed device is fastened rigidly by screws 13 to one of the outer faces of the guide part of the device 3, itself fixed to the support 7.

The flexible pipe 11, which consists of a metal tube having corrugations making it easier for it to bend, makes it possible to connect the housing 10 located outside the water box to the loading unit 12 located in the water box under the tube plate of the steam generator. This flexible tube of a type known in the prior art has a length of several meters determined by the size of the water box and selected so that the operator can use the housing at a location distant from the accss hatch to the water box, through which the tool and its feed device are introduced. The inside diameter of the flexible pipe 11 is substantially greater than the outside diameter of the plug 15 which, in Figure 1, is shown in its position screwed to the end of the mandrel 2 of the tool 1.

Figure 3:
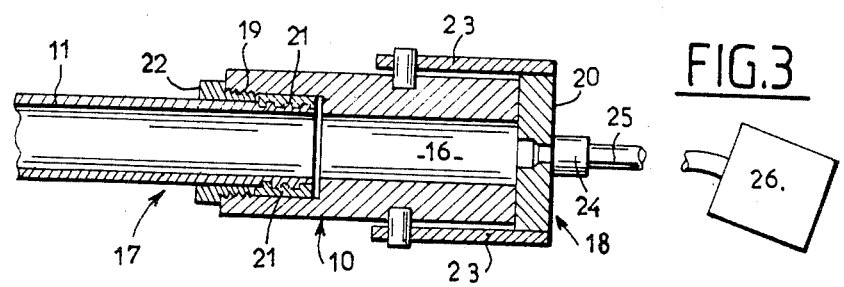
FIG. 3 is a sectional view of the housing of the feed device.

As can be seen in FIGS. 1 and 3, the parallelepipedic feed housing 10 has an inner bore 16, the diameter of which is substantially equal to the inside diameter of the flexible pipe 11. The housing 10 has two opposite faces 17 and 18, between which the bore 16 extends. The face 17 is perforated with an orifice 19, into which the end of the flexible pipe 11 is fitted. This end is retained in the housing 10 by means of two half-shells 21 and a nut 22.

The second face 18 of the housing 10, onto which the bore 16 opens, is equipped with a removable closing cover 20 articulated on the body of the housing by means of arms 23. A nozzle 24 passes through this cover 20 and is connected by means of a tube 25 to a compressed-air source 26 equipped with a stop means making it possible to convey the compressed air into the tube 25 or to interrupt the flow of air in this tube.

Figure 5:
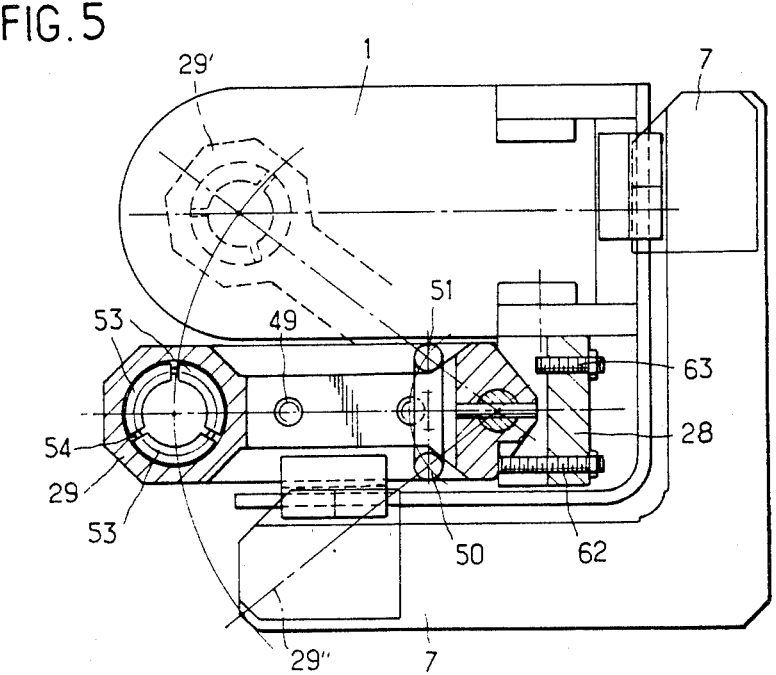
FIG. 5 is a sectional view along V—V of FIG. 4.
Figure 4:
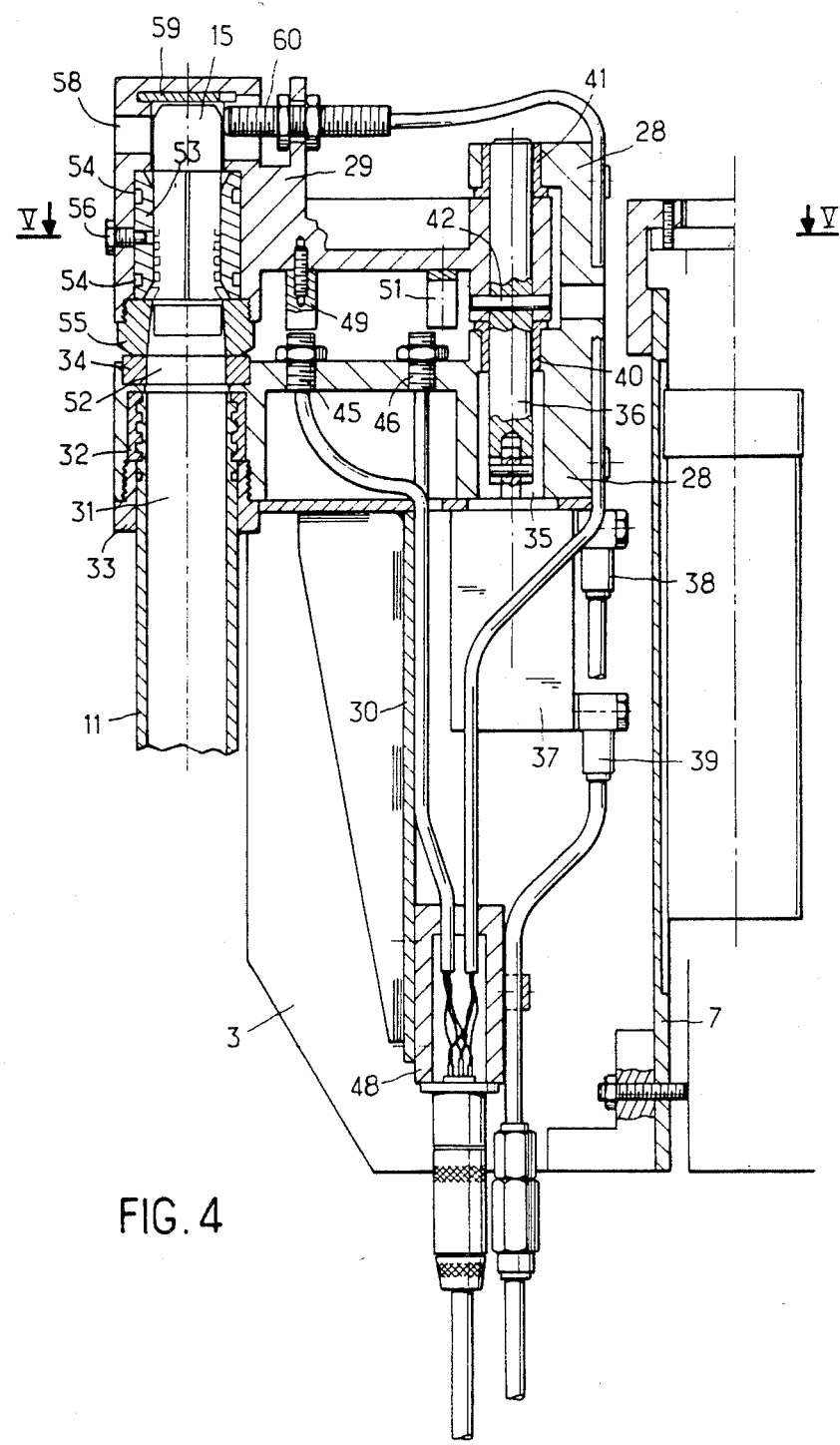
FIG. 4 is a view in vertical section of the loading unit of the feed device.

FIGS. 4 and 5 illustrate the plug loading unit 12 which consists of a fixed part 28 and an arm 29.

Fixed part 28 is fixed to the movement device 3 and to the support 7 by means of a supporting bracket 30. The fixed part 28 has a vertical bore 31, pointed in the direction of movement of the tool 1. The end of the flexible pipe 11 opposite the housing 10 is fastened to the bore 31 by means of two half-shells 32 and a nut 33. A rubber ring 34 is also arranged at the outlet of the bore 31 so as to project slightly relative to the upper face of the fixed part 28. The fixed part 28 also has a bore 35 of vertical axis in a region distant from the bore 31. The bore 35 allows the passage of a vertical shaft 36 connected, at one of its ends, to a rotary pneumatic jack 37 supplied with compressed air via conduits 38 and 39.

Shaft 36 is mounted rotatably in the bore 35 by means of bearings 40 and 41.

The rotary arm 29 is fastened rigidly to the shaft 36 by means of a pin 42. The rotary arm 29 is thus mounted rotatably inside the fixed part 28 between the two plain bearings 40 and 41 forming stops for the arm 29.

The rotary pneumatic jack 37 is fixed to the supporting bracket 30 in the region of an orifice which allows its output shaft to pass through and which is in the extension of the bore 35. The fixed part 28 also carries two electromagnetic position detectors 45 and 46 which are connected to a junction box 48 carried by the supporting bracket 30, for their power supply and for receiving the detection signals.

The rotary arm 29 carries detector studs 49, 50 and 51 which interact with the position detectors 45 and 46 to determine the successive positions of the arm 29.

The arm 29, at its end opposite the joint formed by the vertical shaft 36, has a receptacle 52 which makes it possible to receive a plug 15 in one of the positions of the arm 29. This receptacle 52 comprises a widened central part, in which are arranged three cylindrical 120° sectors 53, held relative to one another by means of two O-rings 54, to form a clamp gripping the plug 15, the diameter of which is less than the diameter of the plug, when the sectors 53 come up against one another under the influence of the O-rings 54. The gripping clamp formed by the cylindrical sectors 53 is retained in the receptacle 52 by a nut 55 screwed to the end of the bore forming the receptacle 52 in the arm 29. A screw 56 makes it possible to hold the plug gripping clamp to prevent it from rotating in the receptacle 52. The upper part of the receptacle 52 has an observation window 58 making it possible to check the presence of the plug 15 in the receptacle 52 by means of a television camera. A detector 60 is also mounted on the arm 29, in such a way that its tracer penetrates very slightly into the receptacle 52 and makes it possible to detect the presence of the plug 15. The detector 60 is connected to the junction box 48 for its power supply and for receiving the detection signals.

The upper face of the receptacle 52 is lined with a rubber washer 59 which makes it possible to cushion the impact caused when the plug 15 enters the upper part of the receptacle 52.

The mode of operation of the feed device according to the invention will now be described with reference to the drawings as a whole.

We shall assume that, initially, the mandrel 2 of the tool which has just positioned and expanded a plug in a steam generator tube is in its retracted, i.e., low position, inside the tubular element 6 (see FIG. 1) forming the bearing anvil for the plug during the expansion phase.

The tool is then moved, by means of the movable support, into a new operating position vertically in line with a tube which is to be plugged.

The arm 29 of the loading unit is in its position shown in FIGS. 1, 2 and 4, corresponding to the position of this arm represented by solid lines in FIG. 5. In this position, the receptacle 52 for the plug inside the arm 29 is aligned with the bore 31 of the fixed part 28, in which the end of the flexible pipe 11 is fastened. The bore 31 and the rceptacle 52 form a single volume the end nut 55 of the receptacle 52 coming sealingly up against the ring 34 of the fixed part 28. The stud 49 of the arm 29 is then exactly vertically in line with the detector 45 which transmits a signal indicating that the arm is in its feed position.

This position is monitored by the operator from the control station outside the water box of the steam generator.

The operator can then feed the rotary arm by introducing a plug into the receptacle 52. To do this, the operator opens the cover 20 of the housing 10 and inserts a plug into the bore 16. After the cover 20 has been closed, compressed air is conveyed into the housing 10 via the tube 25 and the nozzle 24, thus making it possible to force the plug 15 into the flexible pipe 11 and then into the bore 31 and into the receptacle 52. In order to penetrate into the receptacle 52, the plug 15 spreads the sectors 53 which ensure that the plug is braked and then retained in the receptacle 52. At the end of its travel, the plug comes up against the rubber shock-absorbing washer 59. The presence of the plug in the receptacle 52 can then be checked via the window 58 by means of the camera and/or by means of the presence detector 60.

After the presence of the plug has been checked, the arm 29 is made to rotate by conveying compressed-air into the rotary pneumatic jack 37 by means of the conduit 38. The arm 29 comes into its position 29' (FIG. 5), in which the receptacle 52 containing the plug 15 retained by the sectors 53 assumes a position located exactly vertically above the mandrel 2 of the tool 1. In this position, the stud 51 of the arm 29 is exactly vertically in line with the position detector 46, the signal of which indicates to the operator that the plug is vertically above the mandrel of the tool. The mandrel 2 of the tool can then be rotated and it then moves upwards and screws into the plug 15.

After the mandrel has been screwed into the plug completely, the jack of the tool 1 is actuated in order to move the mandrel 2 downwards. The mandrel 2 thus drives the plug 15 outside the receptacle 52 and the arm 29 is returned to its initial position.

The plug is then positioned and expanded by means of the tool 1 according to the conventional technique known in the prior art.

The feed device is then returned into a position making it possible to feed the receptacle 52 in order to carry out a reloading of the tool in a subsequent phase.

It may be noted that the arm 29 can assume one of two loading positions 29' and 29" which are symmetrical relative to the intermediate feed position of the arm. The feed device can carry out the loading of the tool in these two symmetrical positions.

As can be seen in FIG. 5, the fixed part 28 of the loading unit has rear stops 62 and 63, against which the arm 29 comes to rest in its feed position and in its loading position, respectively. The arm is thus positioned exactly in each of the phases of use of the feed device.

It will therefore be seen that the main advantages of the feed device according to the invention are that it becomes possible to supply the tool with plugs simply, reliably and quickly from outside the water box of the steam generator.

It will therefore be possible to plug any number of tubes, the period of operation of the automatic plugging machine no longer being limited by the capacity of a magazine containing a certain quantity of plugs.

It is possible to use a feed housing or a tool loading device of a form different from those described.

In particular, it is possible for a clamp or other device for retaining the plugs in the receptacle of the rotary arm to be in a form other than that described and actuated, for example, in the form of springs or pneumatic or hydraulic means.

It is likewise possible to use means for detecting the position of the arm or the presence of the plug in the receptacle of this arm which are of a form different from those described.

Finally, the feed device according to the invention can be used for feeding cylindrical pieces different from plugs closing steam generator tubes to an automatic machine from a location distant from this machine.

The invention can have uses in sectors other than the nuclear sector, in particular in the sector of the chemical industry and machining in general, on machines with or without the removal of chips.

What is claimed is:

1. Device for the remote feeding of cylindrical pieces to an automatic machine for plugging the tubes of a steam generator of a pressurized-water nuclear reactor, said machine comprising a support (7, 3) connected to an installation and a tool (1) movable on said support (7, 3) in a vertical direction, for taking up said cylindrical pieces (15) and positioning them in said installation, said device comprising
   (a) a feed housing (10) of a size sufficient to contain a cylindrical piece (15) and having two opposite faces (17, 18) each provided with an orifice (19, 16), a first one (16) of said orifices, of a size sufficient to allow the passage of a cylindrical piece being equipped with a removable cover (20) through which passes a nozzle (24) connected to a compressed-air distribution means (25, 26), and a second orifice (19) being aligned with said first orifice;
   (b) a flexible pipe (11), the inside diameter of which is greater than the diameter of said cylindrical pieces (15) and which is fastened at one of its ends to said housing (10) in the region of said second orifice (19); and
   (c) a loading unit (12) fastened to the support (3, 7) and consisting of:
      (i) a fixed part (28) connected rigidly to said support (3, 7) and having a bore (31) which extends in a direction parallel to the direction of movement of said tool (1) and in which is fastened the second end of said flexible pipe (11); and
      (ii) a rotary arm (29) which has a receptacle (52) for receiving a cylindrical piece (15) and which is mounted on the fixed part (28) so as to be articulated about an axis parallel to the direction of movement of said tool (1) and is movable, by a means for movement (37), between a position for receiving the cylindrical pieces (15), in which the receptacle (52) of the rotary arm (29) is in the extension of the bore (31) of the fixed part (28), and at least one loading position, in which a cylindrical piece (15) located inside said receptacle (52) of said rotary arm (29) can be taken up by said tool (1) wherein (d) the receptacle (52) of said rotary arm (29) contains a clamp for retaining said cylindrical pieces (15), said clamp consisting of cylindrical sectors (53) held by at least two elastic O-rings (54), so as to form a deformable cylinder the inside diameter of which is less than the diameter of said cylindrical pieces (15).

2. Feed device according to claim 1, wherein the means (37) of movement of the rotary arm (29) consists of a rotary pneumatic jack.

3. Feed device according to claim 1, wherein the fixed part (28) and the rotary arm (29) of the loading unit (12) comprise complementary means (25, 26-49, 50, 51) for detecting the position of the rotary arm (29) relative to the fixed part (28), to the support (3, 7) and to the tool (1).

4. Feed device according to claim 3, wherein the complementary means (45, 46-49, 50, 51) consist of electromagnetic detectors and metal studs, respectively.

5. Feed device accordig to claim 1, wherein at least one means (60) for detecting the presence of a cylindrical piece (15) in the receptacle (52) is associated with the rotary arm (29).

6. Feed device according to claim 1, wherein a ring made of an elastic material (34) is arranged at the outlet of and on the peripheral part of the bore (31) of the fixed part (28) of the loading unit, to ensure the junction of this bore (31) with the receptacle (52) of the rotary arm (29) in the feed position of this rotary arm (29).

7. Feed device according to claim 1, wherein the flexible pipe (11) consists of a metal tube which has corrugations over its entire length to make it easier for it to bend.

* * * * *